United States Patent
Yuan (10) Patent No.: US 10,928,097 B2
(45) Date of Patent: Feb. 23, 2021

(54) SYSTEM AND METHOD FOR GENERATING HEATED WATER AND DISTILLED WATER

(71) Applicant: CANADAVFD CORP (LTD), Ottawa (CA)

(72) Inventor: Defang Yuan, Ottawa (CA)

(*) Notice: Subject to any disclaimer, the term of this patent is extended or adjusted under 35 U.S.C. 154(b) by 333 days.

(21) Appl. No.: 15/978,775

(22) Filed: May 14, 2018

(65) Prior Publication Data

US 2018/0340708 A1 Nov. 29, 2018

Related U.S. Application Data

(60) Provisional application No. 62/510,946, filed on May 25, 2017.

(51) Int. Cl.
| | |
|---|---|
| *F24H 1/52* | (2006.01) |
| *C02F 1/04* | (2006.01) |
| *F22B 1/28* | (2006.01) |
| *F24D 17/00* | (2006.01) |
| *F24D 19/08* | (2006.01) |

(52) U.S. Cl.
CPC .............. *F24H 1/52* (2013.01); *C02F 1/04* (2013.01); *F22B 1/284* (2013.01); *F24D 17/0031* (2013.01); *C02F 2209/006* (2013.01); *C02F 2209/02* (2013.01); *C02F 2209/42* (2013.01); *F24D 19/081* (2013.01)

(58) Field of Classification Search
CPC ........................................................ F24H 1/52
See application file for complete search history.

(56) References Cited

U.S. PATENT DOCUMENTS

| | | | | |
|---|---|---|---|---|
| 4,549,936 A * | 10/1985 | Erickson | ................ | B01D 3/02 202/167 |
| 4,690,102 A * | 9/1987 | Sundquist | ................ | C02F 1/16 202/166 |
| 4,946,558 A * | 8/1990 | Salmon | ................ | B01D 3/00 202/167 |
| 5,037,510 A * | 8/1991 | Nygards | ................ | C02F 1/04 122/18.31 |
| 5,348,623 A * | 9/1994 | Salmon | ................ | B01D 1/0017 159/44 |

(Continued)

FOREIGN PATENT DOCUMENTS

KR    200474898 Y1 * 10/2014

OTHER PUBLICATIONS

KR200474898Y1—machine translation (Year: 2013).*

*Primary Examiner* — Nathaniel Herzfeld (57) ABSTRACT

Disclosed is a water system that generates heated water and distilled water. The water system has a boiler configured to boil water to produce steam. The water system also has a condensing conduit to receive the steam, wherein thermal energy is removed to condense the steam into distilled water and to cool the distilled water. A heat exchanger is thermally coupled to the condensing conduit to remove a first portion of the thermal energy. The heat exchanger has a heating conduit configured to receive water and to heat the water using the first portion of the thermal energy to produce heated water. According to an embodiment of the disclosure, the water system also has a heat remover thermally coupled to the condensing conduit to remove a second portion of the thermal energy thereby cooling the distilled water in the condensing conduit.

18 Claims, 6 Drawing Sheets

(56) References Cited

U.S. PATENT DOCUMENTS

| | | | | |
|---|---|---|---|---|
| 5,630,913 A * | 5/1997 | Tajer-Ardebili | ....... | B01D 3/007 |
| | | | | 202/176 |
| 6,113,744 A * | 9/2000 | Munro | ..................... | B01D 3/42 |
| | | | | 202/167 |
| 2003/0155226 A9 * | 8/2003 | Wilks | ................... | B01D 1/0017 |
| | | | | 202/88 |

* cited by examiner

SYSTEM AND METHOD FOR GENERATING HEATED WATER AND DISTILLED WATER

CROSS-REFERENCE TO RELATED APPLICATIONS

This application claims priority to U.S. Application No. 62/510,946, filed May 25, 2017, which is incorporated herein by reference in its entirety.

FIELD OF THE DISCLOSURE

This disclosure relates to water systems, and more particularly to water systems that generate heated water and distilled water.

BACKGROUND

A person may use about 75 L of hot water in a typical day for various activities such as showering or bathing, washing hands, washing clothing, washing dishes, etc. About 19% of energy consumption in a household is used for heating up water. At present, most household water heating systems use direct heating. This involves a water heater heating up water directly. People pay for the energy cost and in turn get only hot water.

Drinking water safety can be a serious problem in some geographic regions including North America. Distilled water is one choice. The average cost of commercial distilled water is about $1.2 per gallon, and each person needs about 2 L of drinking water each day. For a family of three, the cost every year may be over $650 to obtain distilled water from commercial supplies.

SUMMARY OF THE DISCLOSURE

Disclosed is a water system that generates heated water and distilled water. The water system has a boiler configured to boil water to produce steam. The water system also has a condensing conduit to receive the steam, wherein thermal energy is removed to condense the steam into distilled water and to cool the distilled water. A heat exchanger is thermally coupled to the condensing conduit to remove a first portion of the thermal energy. The heat exchanger has a heating conduit configured to receive water and to heat the water using the first portion of the thermal energy to produce heated water. According to an embodiment of the disclosure, the water system also has a heat remover thermally coupled to the condensing conduit to remove a second portion of the thermal energy thereby cooling the distilled water in the condensing conduit.

In some implementations, the water system produces the heated water and the distilled water at same time at almost no extra energy cost compared to conventional household water heating systems. In some implementations, almost no more extra energy is needed, and the distilled water is a cost-free by-product. Advantageously, the distilled water is cooled by the heat remover. Thus, the distilled water can be promptly consumed without having to wait for the distilled water to cool down on its own. In some implementations, the distilled water is significantly cooler than the heated water.

Also disclosed is a method for generating the heated water and the distilled water.

Also disclosed is a kit for retrofitting an existing water supply system with a water system as summarised above.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

System for Generating Heated Water and Distilled Water

Figure 1:
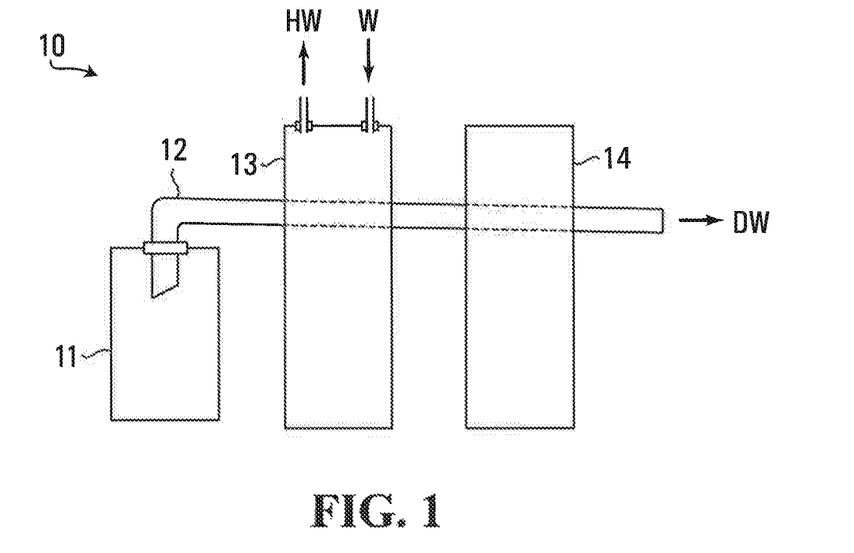
FIGS. 1 to 3 are block diagrams of water systems for generating heated water and distilled water.

Referring now to FIG. 1, shown is a block diagram of a water system 10 for generating heated water and distilled water. The water system 10 has a boiler 11, a condensing conduit 12, a heat exchanger 13, a heat remover 14, and may have other components that are not shown. Operation of the water system 10 will be described below by way of example.

The boiler 11 is configured to boil water to produce steam. The steam is provided to the condensing conduit 12 in which thermal energy is removed to condense the steam into distilled water and to cool the distilled water. The heat exchanger 13 is thermally coupled to the condensing conduit 12 to remove a first portion of the thermal energy. The heat exchanger 13 has a heating conduit configured to receive water W and to heat the water W using the first portion of the thermal energy to produce heated water HW. In some implementations, the heated water HW is provided to a point-of-use device (not shown) such as a faucet for a sink or a faucet for a shower head for example.

After the steam has been condensed into distilled water, the distilled water is still quite hot. For example, the distilled water in the condensing conduit 12 in vicinity of the heat exchanger 13 might be about 75° C., which may be too hot for consumption. In accordance with an embodiment of the disclosure, the heat remover 14 is thermally coupled to the condensing conduit 12 to remove a second portion of the thermal energy thereby cooling the distilled water in the condensing conduit 12. For example, the distilled water DW leaving the condensing conduit 12 after the heat remover 14 might be about 40° C. or less, which is cool enough for consumption. In some implementations, the distilled water DW is provided to a point-of-use device (not shown) such as a water dispenser for example.

There are many possibilities for the heat remover 14. In some implementations, the heat remover 14 is a heat exchanger. An example of this is described below with reference to FIGS. 2 and 3. In other implementations, the heat remover 14 removes heat from the condensing conduit 12 by other means, such as by enabling an endothermic chemical reaction, or by a Peltier cooler, or a heat pump. Other implementations are possible. More generally, the heat remover 14 includes any appropriate component or combination of components to remove heat from the condensing conduit 12 to cool the distilled water.

Figure 2:
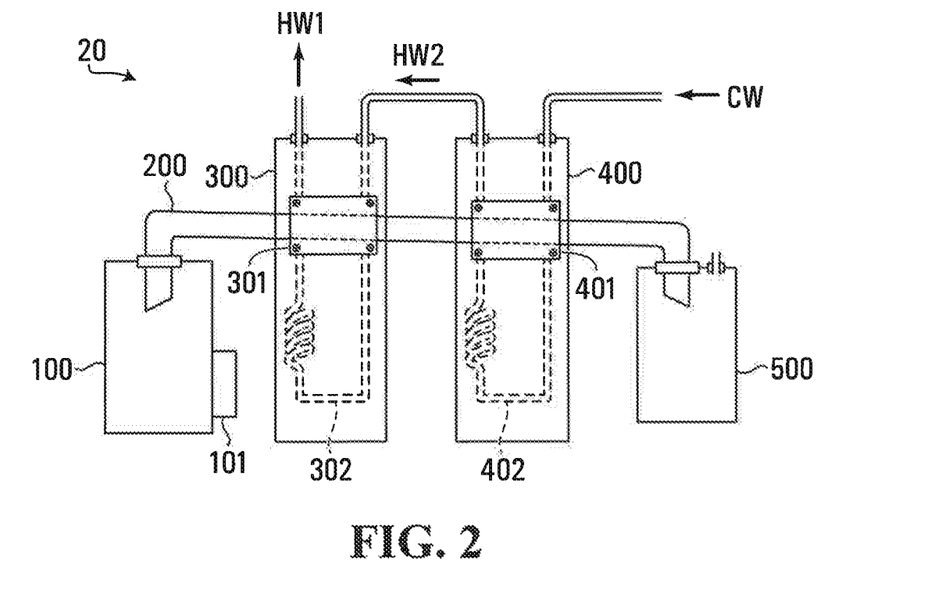

Referring now to FIG. 2, shown is a block diagram of another water system 20 for generating heated water and distilled water. The water system 20 has a boiler 100, a condensing conduit 200, a first heat exchanger 300, 301 and 302, a second heat exchanger 400, 401 and 402, a reservoir 500, and may have other components that are not shown. Operation of the water system 20 will be described below by way of example.

The boiler 100 is configured to boil water to produce steam. In some implementations, the boiler 100 has a heat source 101 for boiling the water. The steam produced by the boiler 100 is provided to the condensing conduit 200 in which thermal energy is removed to condense the steam into distilled water and to cool the distilled water.

The first heat exchanger 300, 301 and 302 is thermally coupled to the condensing conduit 200 to remove a first portion of the thermal energy. In the illustrated example, the first heat exchanger 300, 301 and 302 has a first tank 300 and a conducting plate 301 for thermally coupling the first tank 300 to the condensing conduit 200. The first tank 300 has a first heating conduit 302 configured to receive water and to heat the water using the first portion of the thermal energy to produce heated water HW1. In some implementations, the first tank 300 is configured to store fluid (e.g. distilled water) that functions as heat storage and thermally conducts with the first heating conduit 302. Thus, when the first tank 300 is heated using the first portion of the thermal energy, the fluid inside the first tank 300 and the first heating conduit 302 are likewise heated. At any given time the amount of thermal energy absorbed by the water in the first heating conduit 302 may not be equal to the first portion of the thermal energy taken from the steam/hot distilled water in the condensing conduit 200, particularly if the amount of heat storage of the fluid in the the first tank 300 is increasing or decreasing.

In some implementations, the first heat exchanger 300, 301 and 302 operates to condense the steam in the condensing conduit 200 into distilled water, but the distilled water at this stage is still quite hot. For example, the distilled water in the condensing conduit 200 in vicinity of the first heat exchanger 300, 301 and 302 might be about 75° C., which may be too hot for consumption. In accordance with an embodiment of the disclosure, the second heat exchanger 400, 401 and 402 is thermally coupled to the condensing conduit 200 to remove a second portion of the thermal energy thereby cooling the distilled water in the condensing conduit 200. For example, the distilled water DW leaving the condensing conduit 200 after the second heat exchanger 400, 401 and 402 might be about 40° C. or less, which is cool enough for consumption. The distilled water DW is collected in the reservoir 500 for use (e.g. for drinking).

In the illustrated example, the second heat exchanger 400, 401 and 402 has a second tank 400 and a conducting plate 401 for thermally coupling the second tank 400 to the condensing conduit 200. The second tank 400 has a second heating conduit 402 configured to receive water CW (e.g. cold or unheated water) and to heat the water CW using the second portion of the thermal energy to produce heated water HW2. In some implementations, the second tank 400 is configured to store fluid (e.g. distilled water) that functions as heat storage and thermally conducts with the second heating conduit 402. Thus, when the second tank 400 is heated using the second portion of the thermal energy, the fluid inside the second tank 400 and the second heating conduit 402 are likewise heated. At any given time the amount of thermal energy absorbed by the water in the second heating conduit 402 may not be equal to the second portion of the thermal energy taken from the hot distilled water in the condensing conduit 200, particularly if the amount of heat storage of the fluid in the the second tank 400 is increasing or decreasing.

In some implementations, the water system 20 is configured to supply the heated water HW2 from the second heat exchanger 400, 401 and 402 to the first heat exchanger 300, 301 and 302. Advantageously, this makes use of the heated water HW2 from the second heat exchanger 400, 401 and 402 to recover more thermal energy. The result is that the heated water HW1 from the first heat exchanger 300, 301 and 302 may be hotter than if the first heat exchanger 300, 301 and 302 were to instead receive cold or unheated water. In other implementations, the water system 20 does not make use of the heated water HW2 from the second heat exchanger 400, 401 and 402.

The first heat exchanger 300, 301 and 302 and the second heat exchanger 400, 401 and 402 as shown in FIG. 2 are one of many possible implementations. As noted above, the first heat exchanger 300, 301 and 302 and the second heat exchanger 400, 401 and 402 include the conducting plates 301 and 401. However, in another implementation, the condensing conduit 200 goes through the tanks 300 and 400 in which case there may be no conducting plates 301 and 401. As also noted above, the first heat exchanger 300, 301 and 302 and the second heat exchanger 400, 401 and 402 include the tanks 300 and 400, which are filled with fluid (e.g. distilled water) to function as heat storage and to conduct heat to the heating conduits 302 and 402. However, in another implementation, no fluid is used to conduct heat to the heating conduits 302 and 402. In this regard, instead of using the tanks 300 and 400, solid masses (e.g. metal such as aluminum or copper) with heating conduits carved out can be used. Other heat storage/exchangers are possible and are within the scope of the disclosure.

Figure 3:
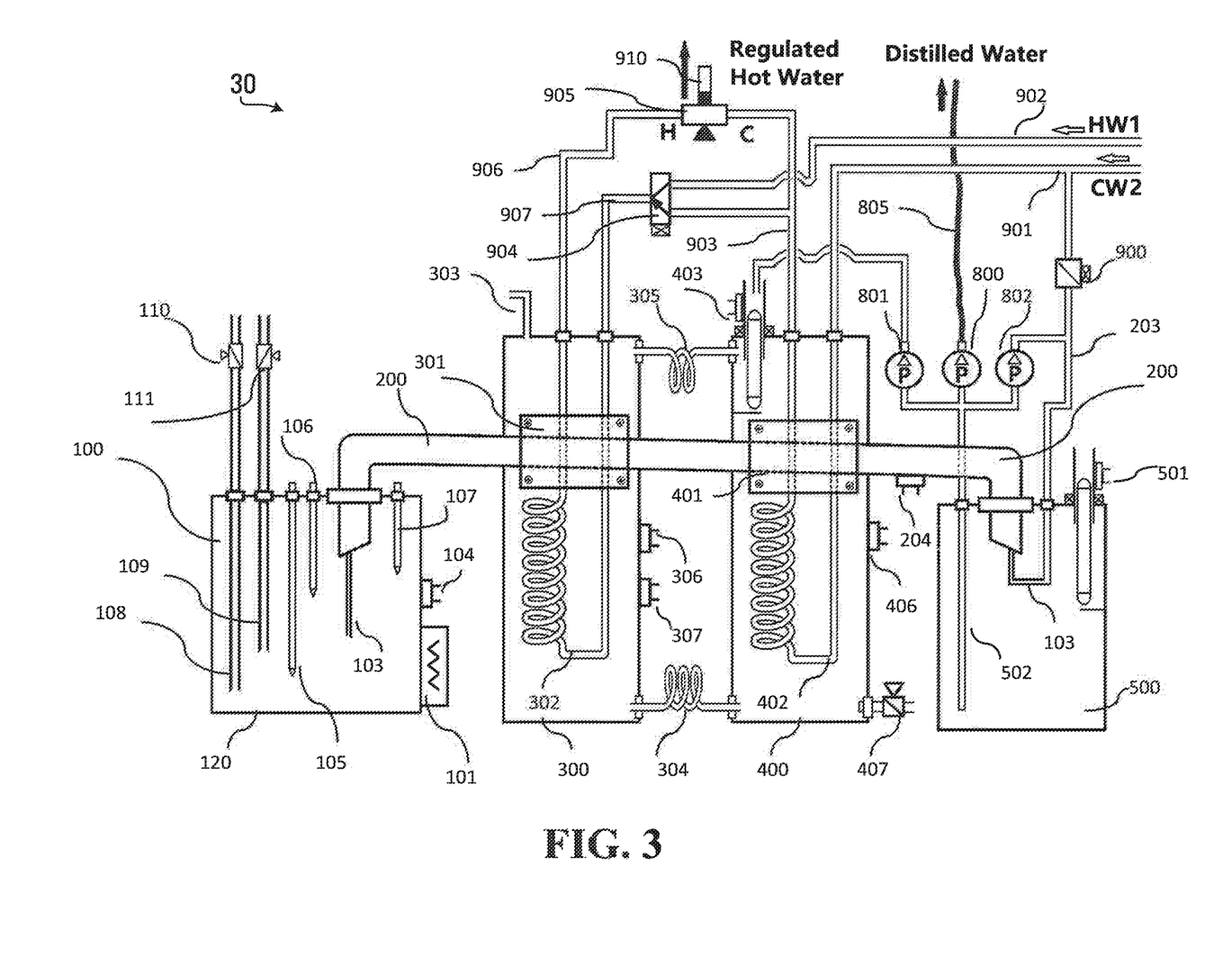

Referring now to FIG. 3, shown is a block diagram of another water system 30 for generating heated water and distilled water. Much like the water system 20 of FIG. 2, the water system 30 of FIG. 3 has a boiler 100, a condensing conduit 200, a first heat exchanger 300, 301 and 302, a second heat exchanger 400, 401 and 402, and a reservoir 500. However, the water system 30 of FIG. 3 is shown with several additional components, which are described below.

The boiler 100 receives water from a pipe 103. The water in the boiler 100 is heated by a heat source 101. When the water reaches a temperature of about 100° C. or higher, it vaporises into steam, which flows into the condensing conduit 200 by vaporisation pressure. While in the condensing conduit 200, thermal energy is removed to condense the steam into distilled water and to cool the distilled water. A first portion of the thermal energy is removed by the first heat exchanger 300, 301 and 302, and a second portion of the thermal energy is removed by the second heat exchanger 400, 401 and 402.

In some implementations, the boiler 100 has a closed container 120. The closed container 120 can be made of copper, aluminum, or stainless steel to contain and boil water. In some implementations, the heat source 101 is combined with the closed container 120. The heat source 101 may be placed inside or outside of the closed container 120 to transfer heat energy from the heat source 101 to the water in the boiler 100. The heat source 101 can be an electric heater, a gas heater, a chemical heater or another heat source.

In some implementations, the temperature inside the closed container 120 is regulated at 101° C. to 110° C. to keep the water properly boiling and vaporising. In some implementations, the heat source 101 has its own temperature control system, and the temperature of the water in the closed container 120 is regulated by the heat source 101 in normal operation. In some implementations, the boiler 100 has a temperature sensor 104 for over temperature protection. When and if the temperature control system of the heat source 101 is faulty or boiler 100 water refill is faulty, the temperature sensor 104 can detect an abnormal temperature, for example, 120° C., and activate a system shutdown.

When the water in the boiler 100 is vaporised, the same amount of water is fed into the boiler 100 through the pipe 103. The pipe 103 can be made of copper, aluminum, or stainless steel. In some implementations, the pipe 103 is placed inside the condensing conduit 200, which may simplify manufacturing and may assure high efficiency. A separate hole into the boiler 100 for the pipe 103 is not needed. In other implementations, the pipe 103 is disposed outside of the condensing conduit 200, but this may involve more thermal insulation and more pipe connectors, which may complicate manufacturing. In some implementations, the boiler 100 has three water level detection probes 105, 106 and 107. A first probe 105 is for low limit detection, a second probe 106 is for normal water level control, and a third probe 107 is for overflow detection. When the first probe 105 detects a low level, water refilling for the boiler 100 is activated. When the second probe 106 detects a normal level, water refilling for the boiler 100 stops. When the third probe 107 detects an overflow, distilled water may be contaminated by raw water from boiler 100.

In some implementations, the boiler 100 has two purge pipes 108 and 109. De-scale liquid can be purged in and out of the boiler 100 for maintenance purposes, for example when removing any lime scale that may build up inside the boiler 100. In some implementations, the two purge pipes 108 and 109 have shut valves 110 and 111 on the far ends of the pipes. These shut valves 110 and 111 are closed during normal operation, but are opened when de-scaling and/or purging.

In some implementations, the condensing conduit 200 is a single continuous conduit that is angled such that the distilled water flows to the reservoir 500. In other words, the condensing conduit 200 has a steam inlet side that is higher in elevation than a condensed water outlet side, thereby enabling the distilled water inside the condensing conduit 200 to flow freely by gravity towards the reservoir 500. In other implementations, the condensing conduit 200 has multiple separate conduits, for example a first conduit between the boiler 100 and the first tank 300, a second conduit between the first tank 300 and the second tank 400, and a third conduit between the second tank 400 and the reservoir 500. Other implementations are possible. In some implementations, the condensing conduit 200 is formed of any suitable heat-conducting material such as copper for example. In some implementations, the condensing conduit 200 is a pipe. Other implementations are possible.

As noted above, a first portion of the thermal energy is removed from the steam/hot distilled water by the first heat exchanger 300, 301 and 302. The first heat exchanger 300, 301 and 302 has a first tank 300 which is filled with water (e.g. distilled water). When the steam condenses into distilled water inside the condensing conduit 200, it gives out thermal energy, which heats up the water in the first tank 300 via the conducting plate 301. The water in the first tank 300 is always below boiling point (i.e. ~100° C.) and usually below 75° C. The water in the first tank 300 acts as heat storage and a heat exchange carrier. The first tank 300 has a coiled pipe 302 for a heating conduit. The coiled pipe 302 is formed of any suitable heat-conducting material such as copper for example. The coiled pipe 302 is immersed in the water and acts as a heat exchanger. Water flows into the coiled pipe 302 from a pipe 907, then flows out of the coiled pipe 302 to a pipe 906 at a temperature of about 50° C. to 75° C.

Thus, the first heat exchanger 300, 301 and 302 facilitates two heat exchanges: a first heat exchange between steam/hot distilled water in the condensing conduit 200 and the water in the first tank 300 which produces hot water in the first tank 300, and a second heat exchange between the hot water in the first tank 300 and the warm water supplied to the coiled pipe 302 which produces hot water in the pipe 906. In this manner, thermal energy is transferred or exchanged from the steam/hot distilled water in the condensing conduit 200 to the water in the coiled pipe 302. In some implementations, more than 80% of the thermal energy can be transferred in this stage. Meanwhile, the hot water in the first tank 300 is never consumed or mixed with any water that is consumed.

As noted above, a second portion of the thermal energy is removed from the hot distilled water by the second heat exchanger 400, 401 and 402. The second heat exchanger 400, 401 and 402 has a second tank 400 which is filled with water (e.g. distilled water). Thermal energy is transferred to the second tank 400 via the conducting plate 401 thereby cooling the distilled water in the condensing conduit 200 to about 40° C. or less. The water in the second tank 400 is heated to about 40° C. or less. The water in the second tank 400 acts as heat-storage and a heat exchange carrier. The second tank 400 has a coiled pipe 402 for a heating conduit. The coiled pipe 402 is formed of any suitable heat-conducting material such as copper for example. The coiled pipe 402 is immersed in the water and acts as a heat exchanger. Water flows into the coiled pipe 402 from pipe 901, then flows out of the coiled pipe 402 to a pipe 903 at a temperature of about 40° C. or less.

Thus, the second heat exchanger 400, 401 and 402 facilitates two heat exchanges: a first heat exchange between hot distilled water in the condensing conduit 200 and the water in the second tank 400 which produces warm water in the second tank 400, and a second heat exchange between the warm water in the second tank 400 and the unheated water supplied to the coiled pipe 402 which produces warm water in the pipe 903. In this manner, thermal energy is transferred or exchanged from the hot distilled water in the condensing conduit 200 to the water in the coiled pipe 402. Meanwhile, the warm water in the second tank 400 is never consumed or mixed with any water that is consumed.

The water system 30 is configured to supply the heated water from the coiled pipe 402 of the second tank 400 to the coiled pipe 302 of the first tank 300. Advantageously, this makes use of the heated water from the coiled pipe 402 of the second tank 400 to help recover more thermal energy. However, there may be situations in which the first tank 300 is not hot enough to produce heated water with a suitable temperature. This might for example occur if there is frequent and/or prolonged consumption of the heated water. In such situation, the temperature of the first tank 300 may decrease to a point that results in the heated water produced by the coiled pipe 302 of the first tank 300 not being hot enough.

Thus, in some implementations, the water system 30 has a sensor 307 configured to sense a temperature of the first tank 300, and a water supply unit 904 that conditionally supplies the heated water from the coiled pipe 402 of the second tank 400 to the coiled pipe 302 of the first tank 300 based on the temperature of the first tank 300. In the event that the temperature of the first tank 300 is too low, the water supply unit 904 instead supplies heated water HW1 from a water heater (not shown) to the coiled pipe 302 of the first tank 300. At this point, the water supply unit 904 conducts water from the pipe 902 to the pipe 907 thereby enabling auxiliary hot water to flow into the coiled pipe 302 of the first tank 300.

In some implementations, the water supply unit 904 is a switch configured to switch between (1) supplying the heated water from the second heating conduit 402 to the first heating conduit 302 when the temperature that has been sensed is at least a predefined threshold, and (2) supplying the heated water HW1 from the water heater to the first heating conduit 302 when the temperature that has been sensed is below the predefined threshold. In some implementations, the water supply unit 904 is a solenoid valve. In specific implementations, the predefined threshold is 53° C.

When the water system 30 is used in situations where no auxiliary hot water HW1 is available, the water supply unit 904 can be un-installed, and the pipe 903 can be connected to the pipe 907 directly.

As noted above, the temperature sensor 307 is used for selecting water sources between the pipe 903 and the pipe 902. In some implementations, the temperature sensor 307 is also used for turning the heating source 101 ON or OFF. For example, the heat source 101 can be turned ON when temperature is below 55° C. and the heat source 101 can be turned OFF when temperature is over 75° C. In some implementations, in addition to the temperature sensor 307, there is another temperature sensor 306, which is positioned to detect the water temperature in the first tank 300 for over-temperature protection. Under normal operation, water temperature in the first tank 300 should have a temperature of about 75° C. or less. In some implementations, when the temperature sensor 306 detects an abnormal temperature, for example 80° C. or higher, which may occur if the tank 300 is not properly refilled, a system shutdown is activated.

In some implementations, a temperature sensor 406 is positioned to detect the water temperature in the second tank 400. Under normal operation, water temperature in the second tank 400 should have a temperature of about 40° C. or less. In some implementations, when the temperature sensor 406 detects an abnormal temperature, for example 45° C. or higher, a system shutdown is activated.

In some implementations, the water system 30 has a temperature regulator 905 configured to mix an amount of warm water from the coiled pipe 402 of the second tank 400 into the hot water from the coiled pipe 302 of the first tank 300 to produce mixed water having a regulated temperature. The mixed water can be provided to a point-of-use-device (not shown) via a pipe 910. The regulated temperature can be chosen so as to avoid any burning of skin by water that is too hot. In some implementations, the regulated temperature is anywhere between 40° C. to 49° C. In some implementations, the temperature regulator 905 ensures that the temperature of the water flowing out from the pipe 910 is not higher than 49° C. However, other regulated temperatures are possible and are within the scope of this disclosure. In some implementations, the temperature regulator 905 is a thermostatic mixing valve.

In some implementations, the tanks 300 and 400 have balance pipes 304 and 305, which enable the water level in the first tank 300 to be balanced with the water level in the second tank 400. In some implementations, the balance pipe 305 is positioned above the water level of 300 and 400, and the balance pipe 304 is configured to enable fluid communication between the two tanks 300 and 400 while reducing or mitigating heat exchange between the two tanks 300 and 400.

In some implementations, the tanks 300 and 400 have open outlets 303 and 403, which keep the pressure in the tanks 300 and 400 balanced with open air. In some implementations, one of the open outlets 303 and 403 (e.g. the open outlet 403 of the second tank 400 in this example) is combined with a floating water level detector 403, which detects an upper level and a lower level of the water in the second tank 400. The floating water level detector 403 gives a High level status or a Low level status to control the pump 801 to refill the water into the tanks 300 and 400. Also, in some implementations, one of the open outlets 303 and 403 (e.g. the open outlet 403 of the second tank 400 in this example) is configured to receive distilled water from a pump 801. In some implementations, one of the tanks 300 and 400 (e.g. the second tank 400 in this example) has a valve 407 as a drain outlet, which can be used to empty water from both of the tanks 300 and 400 when desired. It is closed in system operation.

In some implementations, a temperature sensor 204 is positioned to detect temperature near the water outlet side of the condensing conduit 200. Under normal operation, the water outlet side of the condensing conduit 200 should have a temperature of about 40° C. or less. In some implementations, when the temperature sensor 204 detects an abnormal temperature, for example 45° C. or higher, a system shutdown is activated.

In some implementations, the outlet of the condensing conduit 200 reaches into the reservoir 500. In any event, the distilled water that has been cooled in the condensing conduit 200 is collected in the reservoir 500. In some implementations, the reservoir 500 is a water container, which is used to store the distilled water. In some implementations, the water system 30 has a pipe 502 as an outlet for the distilled water in the reservoir 500. In some implementations, a pump 800 operates to pump the distilled water out of the reservoir 500 to a point of use device for consumption (e.g. for drinking). The pump 800 can be useful particularly when the point of use device is at a higher elevation than the water system 30 or is disposed relatively far from the water system 30.

In some implementations, the water system 30 has a sensor 501 configured to sense a water level in the reservoir 500, and a pump 802 configured to pump the distilled water from the reservoir 500 back to the boiler 100 via the pipe 103, which functions as a return conduit, when the water level in the reservoir 500 exceeds a predetermined high level. In some implementations, the sensor 501 is a floating water level detector, which detects an upper level and a lower level of the distilled water in the reservoir 500. The floating water level detector 501 gives a High level status or a Low level status. In some implementations, the floating water level detector 501 has an opening on a top side, which keep the pressure in the reservoir 500 balanced with open air.

Therefore, the supply water (feed water) to the boiler 100 has two sources: one is raw water from pipe 901, and another is from the reservoir 500. Usually raw water from the pipe 901 is supplied to the boiler 100. In this situation, a valve 900 is turned ON and the pump 802 is turned OFF such that only raw water from the pipe 901 flows into boiler 100. However, if the distilled water in the reservoir 500 is not consumed in time and it accumulates to a high level, then the valve 900 is turned OFF and the pump 802 is turned ON to pump the distilled water from the reservoir 500 (instead of raw water) to the boiler 100.

Advantageously, the distilled water in the reservoir 500 may keep refreshing in circulation on an ongoing basis, which can help prevent the distilled water in the reservoir 500 from going stale. Also, by pumping the distilled water from the reservoir 500 back to the boiler 100 when the distilled water is not consumed, water is not wasted, and less lime scale may be built up. Meanwhile, the water system 30 may still serve as a high efficiency water heater.

In the illustrated example, three separate pumps 800,801, 802 are implemented, each pump can only conduct water in one direction. However, according to working logic, it is possible to use one pump combined with three controllable valves, or two pumps with two controllable valves, to achieve the described water supply functions. Wherein pump 801 is used to refill water into the tanks 300 and 400 when water level in the tanks 300 and 400 is low.

The water system 30 can be installed in a household to supply heated water and distilled water to people living in the household. However, installations in other buildings such as commercial buildings for example are also possible. The amount of heated water and distilled water to be generated may vary depending on application.

In some implementations, the capacity of the first tank 300 is chosen based on how much hot water is to be used and whether an auxiliary hot water supply is available. A larger capacity for the first tank 300 can facilitate frequent and/or prolonged use of hot water. For example, when used in a basement as primary hot water supply to a whole house, an auxiliary hot water supply is not applied, and therefore a capacity of 150 L to 400 L can be chosen for the first tank 300 for a family of three. However, if an auxiliary hot water supply is available, a smaller capacity may be chosen. For example, when used in a kitchen in which an auxiliary hot water supply is available, a capacity of 10 L to 20 L can be chosen for the first tank 300 for a family of three. Also, when very little hot water usage is expected, a smaller capacity for the first tank 300 may be chosen. Other capacities are possible and are within the scope of this disclosure.

It is noted that the capacity of the second tank 400 does not meaningfully influence productivity of the hot water and the distilled water, but does influence system energy efficiency and distilled water temperature. In some implementations, the capacity of the second tank 400 is between 10 L to 60 L in residential applications.

The water system aims to increase energy efficiency for hot water consumption. Generally, distilled water produced in this system is nearly proportional to the hot water consumed. If more hot water is used, more distilled water may be produced. But how much distilled water is consumed will not influence the hot water production.

Figure 4:
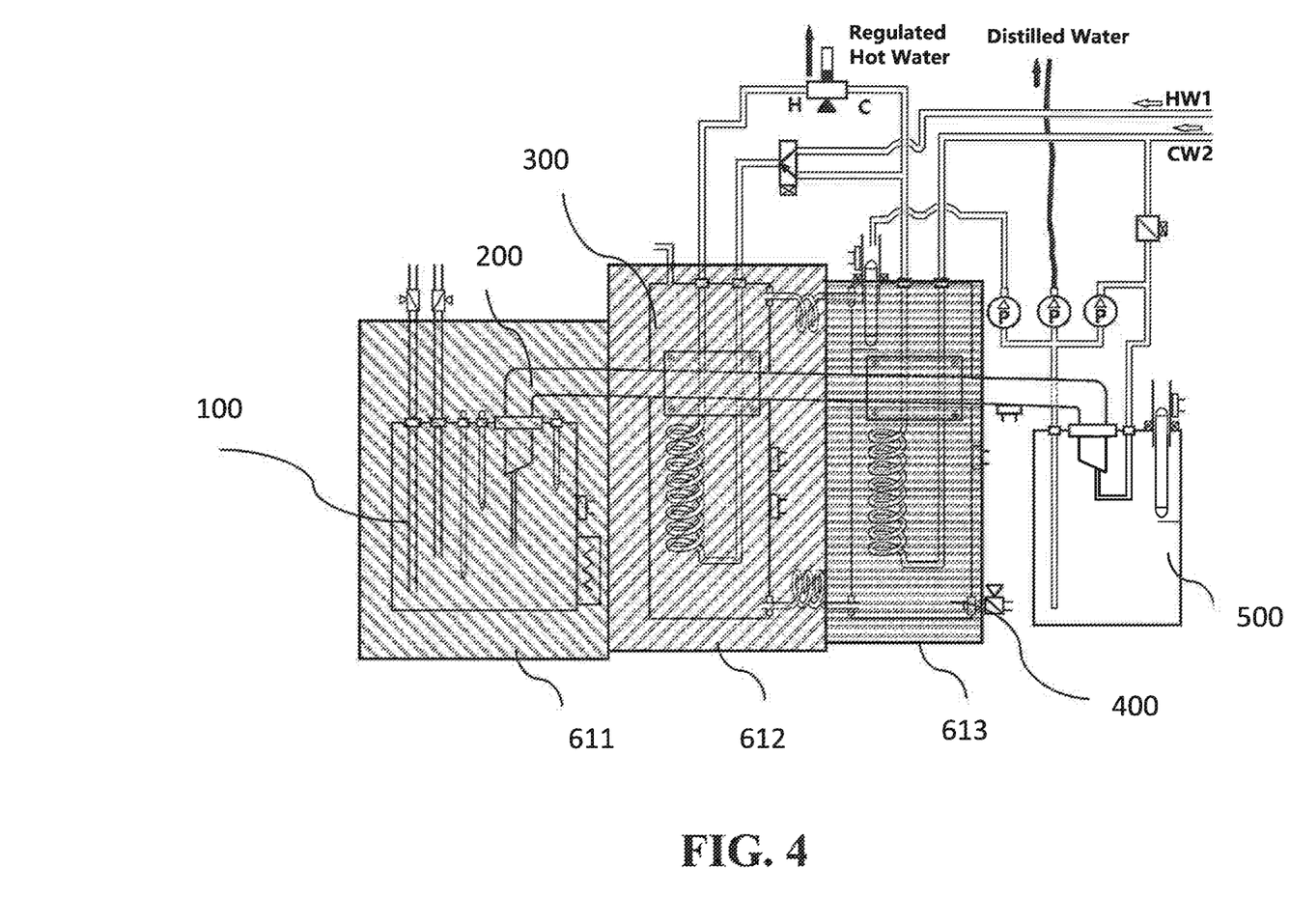
FIG. 4 is a block diagram of the water system of FIG. 3 with thermal insulation.

Referring now to FIG. 4, shown is a block diagram of the water system of FIG. 3 with thermal insulation. In some implementations, thermal insulation with varying thickness is used depending on temperature of components during operation such that hotter components receive thicker thermal insulation. Thus, thick thermal insulation 611 is used for the boiler 100 and a higher end of the condensing conduit 200 because these components are very hot during operation. The thick thermal insulation 611 might for example be 50 mm or thicker. Thick thermal insulation 612 is also used for the first heat exchanger 300, 301 and 302. The thick thermal insulation 612 might for example be 50 mm or thicker. Thin thermal insulation 613 is used for the second heat exchanger 400, 401 and 402 because of moderate temperatures. The thin thermal insulation 613 might for example be 25 mm or thinner. In some implementations, no thermal insulation is applied to the reservoir 500, which is almost at room temperature. In other implementations, very thin thermal insulation is applied to the reservoir 500.

If the first heat exchanger 300, 301 and 302 and the second heat exchanger 400, 401 and 402 are efficient, and all warm or hot components are well-insulated to prevent heat dissipation, then the most of heat energy can be captured and stored in the hot water tank 300 and the warm water tank 400. No significant energy is wasted in operation. Distilled water is obtained at almost no extra energy cost.

The following is a summary of different waters within the water system 30 as well as possible temperatures for the same.

Cold supply water the primary cold water supply, unheated, usually at 4° C. to 20° C.

Auxiliary hot water hot water from an auxiliary heater, such as gas powered water heater, electric water heater, solar water heater, thermal energy water heater. It is usually at 49° C. to 70° C.

Warm water: water in the second tank 400, and water in the pipe 903, usually at 10° C. to 40° C. The temperature of the warm water is 6° C. to 20° C. higher than the cold supply water. The temperature of the warm water is 20° C. to 60° C. lower than the hot water in the first tank 300.

Hot water: hot water in the first tank 300, and hot water in the pipe 906. It is usually at 50° C. to 75° C.

Regulated hot water: water with a regulated temperature in the pipe 910. It is usually at a safe temperature between 40° C. to 49° C. and ready for use.

Raw water: water before distilling. It is from the cold supply water pipe 901.

Distilled water: condensed water from steam. Bacteria, minerals and harmful particles are removed.

Figure 5:
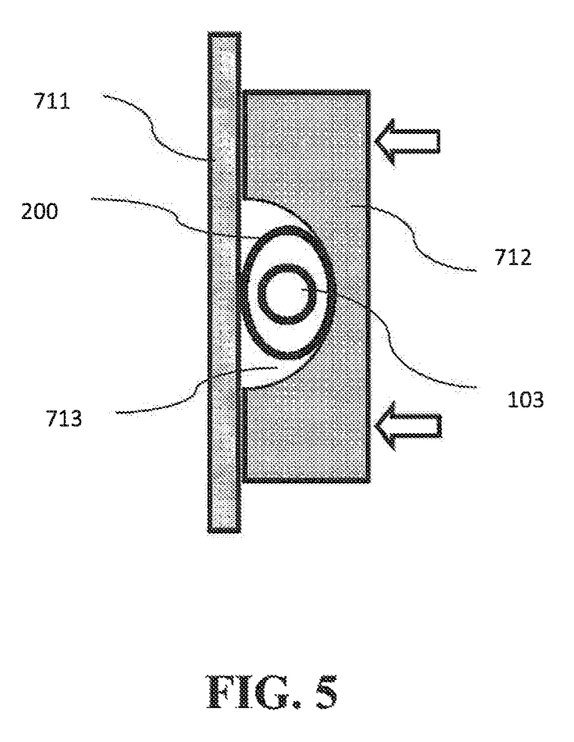
FIG. 5 is a block diagram showing a thermal connection between a condensing conduit and a tank shell.

Referring now to FIG. 5, shown is a block diagram showing a thermal connection between a condensing conduit 200 and a tank shell 711. A conducting plate 712 is formed of any suitable heat-conducting material such as copper for example. The conducting plate 712 has an arc shape recess 713 that is cut out of one side of the conducting plate 712 to thermally couple with the condensing conduit 200. The arc shape recess 713 has a width of about 5 mm to 10 mm wider than an outside diameter of the condensing conduit 200, but has a depth of about 5 mm to 10 mm less than the outside diameter of the condensing conduit 200. The conducting plate 712 presses against the condensing conduit 200 such that the condensing conduit 200 tightly contacted with both the tank shell 711 and the conducting plate 712. In doing so, the condensing conduit 200 is deformed by pressure to make a reliable contact. In other implementations, the pipe 103 disposed inside the condensing conduit 200 is not deformed.

Method for Generating Heated Water and Distilled Water

Figure 6:
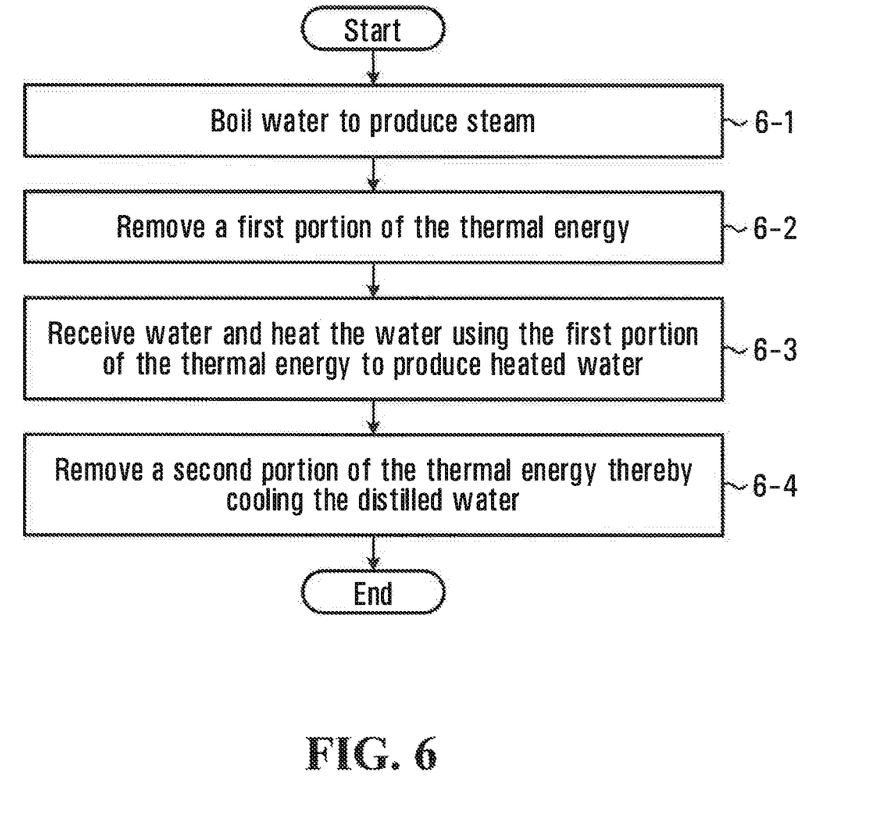
FIGS. 6 and 7 are flowcharts of methods for generating heated water and distilled water.

Referring now to FIG. 6, shown is a flowchart of a method for generating heated water and distilled water. This method may be executed by a water system, for example any of the water systems 10, 20 and 30 shown in FIGS. 1, 2 and 3, or any other appropriately configured water system. Although the flowchart depicts steps being executed in sequence, it is to be understood that some steps may be executed concurrently or in an alternative order to that shown.

Referring first to FIG. 6, the water system boils water to produce steam at step 6-1. The water system operates to remove thermal energy to condense the steam into distilled water and to cool the distilled water. This involves the water system removing a first portion of the thermal energy at step 6-2. The first portion of the thermal energy is used to heat water to produce heated water. In particular, at step 6-3, the water system receives water and heats the water using the first portion of the thermal energy to produce heated water. In some implementations, the heated water is provided to a point-of-use device such as a faucet for a sink or a faucet for a shower head for example.

In some implementations, the steam is condensed into distilled water at steps 6-2 and 6-3 because the first portion of the thermal energy is removed, but the distilled water may be too hot to be consumed. According to an embodiment of the disclosure, at step 6-4 the water system removes a second portion of the thermal energy thereby cooling the distilled water. In some implementations, the distilled water is cooled to about 40° C. or less, which is cool enough for consumption. In some implementations, the distilled water is provided to a point-of-use device such as a water dispenser for example.

In some implementations, the water system receives water and heats the water using the second portion of the thermal energy to produce heated water. The heated water produced using the second portion of the thermal energy is warm but cooler than the heated water produced using the first portion of the thermal energy.

In some implementations, the water system supplies the heated water produced using the second portion of the thermal energy as the water received at step 6-3. Advantageously, this makes use of the heated water produced using the second portion of the thermal energy, which may help recover more thermal energy. The result is that the heated water produced at step 6-3 may be hotter than if unheated water is used at step 6-3. In other implementations, the water system does not make use of the heated water produced using the second portion of the thermal energy.

In some implementations, the water system mixes an amount of the heated water produced using the second portion of the thermal energy with the heated water produced using the first portion of the thermal energy to produce mixed water having a regulated temperature. The regulated temperature can be chosen so as to avoid any burning of skin by water that is too hot. In some implementations, the regulated temperature is anywhere between 40° C. to 49° C. In some implementations, the mixed water is provided to a point-of-use device such as a faucet for a sink or a faucet for a shower head for example.

Figure 7:
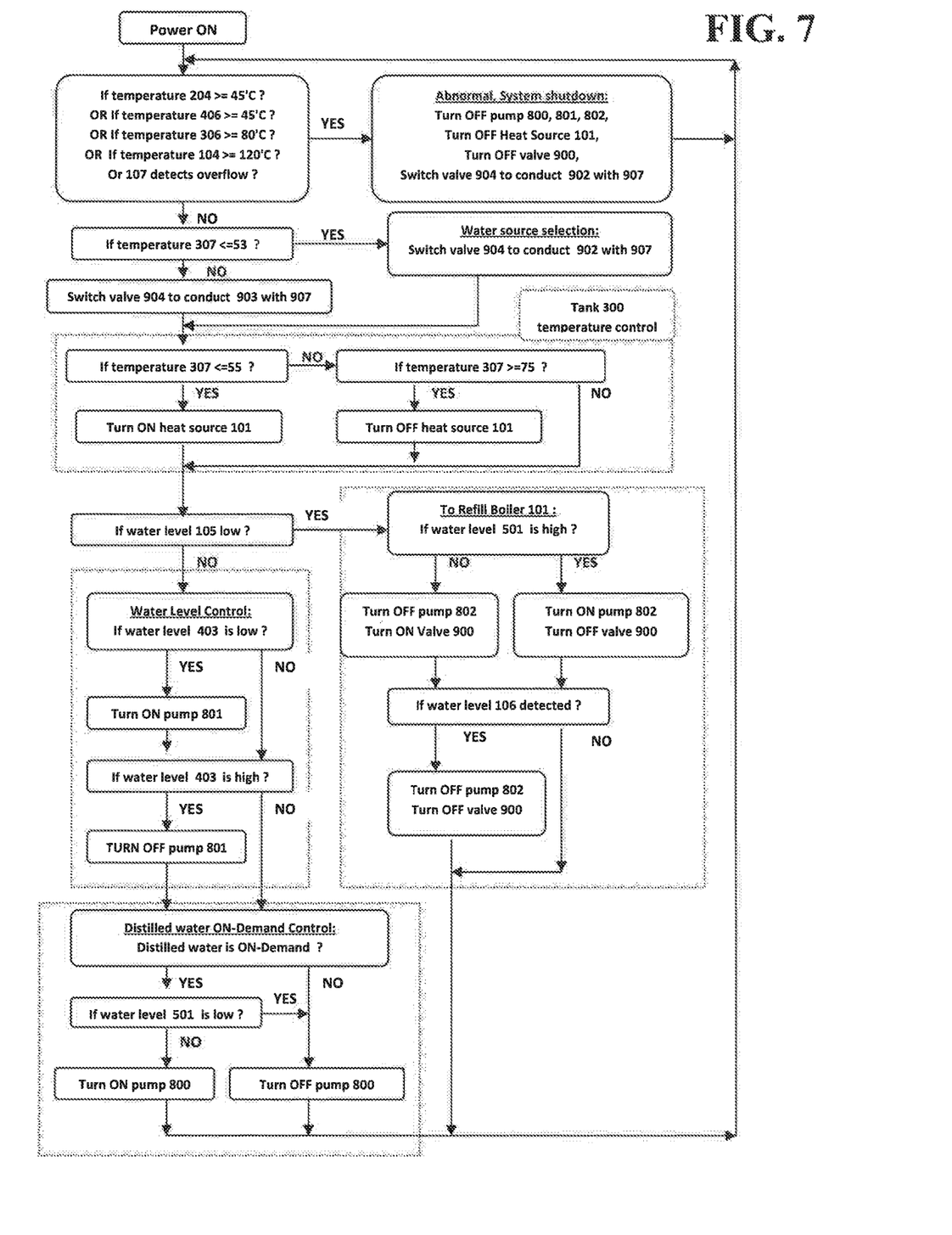

Referring now to FIG. 7, shown is a flowchart of another method for generating heated water and distilled water. The method may be executed by a water system, for example the water system 30 shown in FIG. 3 or any other appropriately configured water system. Although the flowchart depicts steps being executed in sequence, it is to be understood that some steps may be executed concurrently or in an alternative order to that shown.

The flowchart makes reference to various components of the water system 30 shown in FIG. 3 and is self-explanatory. Thus, description of the flowchart is omitted here.

Kit for Retrofitting an Existing System

According to another embodiment of the disclosure, there is provided a kit for retrofitting an existing water supply system in which a point-of-use device receives unheated water from a water line and heated water from a water heater. The kit has a boiler configured to boil unheated water from the water line to produce steam, and a condensing conduit in which thermal energy is removed to condense the steam into distilled water and to cool the distilled water. The kit also has a heat exchanger thermally coupled to the condensing conduit to absorb a first portion of the thermal energy. The heat exchanger has a heating conduit configured to receive water, and heat the water using the first portion of the thermal energy to produce heated water to be supplied to the point-of-use device. The kit also has a heat remover thermally coupled to the condensing conduit to remove a second portion of the thermal energy thereby cooling the distilled water in the condensing conduit.

Numerous modifications and variations of the present disclosure are possible in light of the above teachings. It is therefore to be understood that within the scope of the appended claims, the disclosure may be practised otherwise than as specifically described herein.

I claim:

1. A water system comprising:
a boiler configured to boil water to produce steam;
a condensing conduit to receive the steam, wherein thermal energy is removed to condense the steam into distilled water and to cool the distilled water;
a heat exchanger thermally coupled to the condensing conduit to remove a first portion of the thermal energy, the heat exchanger comprising a first heating conduit configured to receive a first water and to heat the first water using the first portion of the thermal energy to produce a first heated water; and
a heat remover thermally coupled to the condensing conduit to remove a second portion of the thermal energy thereby cooling the distilled water in the condensing conduit, wherein the heat remover further comprising a second heating conduit configured to receive a second water and to heat the second water using the second portion of the thermal energy to produce a second heated water;
a sensor configured to sense a temperature of the heat exchanger;
a water supply unit configured to selectively supply the second heated water from the second heating conduit or a third heated water from a water heater to the first heating conduit as the first water based on the temperature that has been sensed;
and a temperature regulator configured to mix an amount of the second heated water with the first heated water to produce mixed water having a regulated temperature.

2. The water system of claim 1,
wherein: the heat exchanger is a first heat exchanger, comprising the first heating conduit configured to receive the first water and to heat the first water using the first portion of the thermal energy to produce the first heated water, wherein the first portion of the thermal energy in the steam is transferred to the first heated water;
the heat remover is a second heat exchanger comprising the second heating conduit configured to receive the second water and to heat the second water using the second portion of the thermal energy to produce the second heated water, wherein the second portion of the thermal energy in the steam is transferred to the second heated water;

and the second heated water is cooler than the first heated water.

3. The water system of claim 1,
wherein the water system is configured to supply the second heated water to the first heating conduit as the first water, and the second heated water is below 45 degrees Celsius, the first heated water is higher than 55 degrees Celsius.

4. The water system of claim 1,
wherein the water supply unit further comprises a switch configured to switch between:
supplying the second heated water from the second heating conduit to the first heating conduit as the first water when the temperature of the heat exchanger that has been sensed is at least a predefined threshold; and
supplying the third heated water from the water heater to the first heating conduit as the first water when the temperature of the heat exchanger that has been sensed is below the predefined threshold.

5. The water system of claim 1,
wherein: the temperature regulator is configured to mix an amount of the second heated water from the second heating conduit with the first heated water from the first heating conduit to produce mixed water having a regulated temperature below scalding point of 49 degrees Celsius to prevent from burn or scald.

6. The water system of claim 1,
wherein the temperature regulator further comprises a thermostatic mixing valve.

7. The water system of claim 1,
wherein: the heat exchanger further comprises a first tank thermally coupled to the condensing conduit and being configured to store fluid that thermally conducts with the first heating conduit;
and the heat remover further comprises a second tank thermally coupled to the condensing conduit and being configured to store fluid that thermally conducts with the second heating conduit;
wherein the first tank is a first water tank, the second tank is a second water tank.

8. The water system of claim 7,
further comprising: a first water level detector configured to measure a first water level in the first tank and the second tank;
and a first pump configured to pump the distilled water to the first tank and the second tank when the first water level in the first tank and the second tank is below a predefined level; and
wherein the fluid stored in the first and second tank is distilled water.

9. The water system of claim 7,
further comprising at least one balance pipe to enable a water level in the first tank to be balanced with a water level in the second tank;
wherein said at least one balance pipe is configured to enable the fluid communication between the first tank and the second tank while reducing or mitigating heat exchange between the first tank and the second tank.

10. The water system of claim 7,
further comprising: at least one outlet for the first water tank and the second water tank so that pressure in the first water tank and the second water tank is balanced with open air.

11. The water system of claim 7,
further comprising: thermal insulation for the first water tank and the second water tank.

12. The water system of claim 1,
further comprising: a reservoir configured to collect the distilled water that has been cooled.

13. The water system of claim 12,
further comprising: a second pump configured to pump the distilled water from the reservoir to a point-of use device.

14. The water system of claim 12,
further comprising a sensor configured to sense a water level in the reservoir;
and a third pump configured to pump the distilled water from the reservoir back to the boiler via a return conduit when the water level in the reservoir exceeds a predetermined high level.

15. The water system of claim 12,
further comprising a valve configured to supply water from an unheated water source to the boiler via the return conduit when a water level in the reservoir is below a predetermined low level.

16. The water system of claim 15,
wherein the return conduit is disposed inside of the condensing conduit.

17. The water system of claim 15,
wherein the condensing conduit is a single continuous conduit that is angled such that the distilled water flows to the reservoir by gravity.

18. A hot water and distilled water combo system, said system comprising: a boiler configured to boil water to produce steam; a condensing conduit to receive the steam, wherein thermal energy is removed to condense the steam into distilled water and to cool the distilled water; a first tank thermally coupled to the condensing conduit to absorb a first portion of the thermal energy, the first tank comprising a first heating conduit configured to receive first water and to heat the first water using the first portion of the thermal energy to produce first heated water; a second tank thermally coupled to the condensing conduit to absorb a second portion of the thermal energy thereby cooling the distilled water in the condensing conduit, the second tank comprising a second heating conduit configured to receive second water and to heat the second water using the second portion of the thermal energy to produce second heated water, wherein the second heated water is cooler than the first heated water; a sensor configured to sense a temperature of the first tank; a water supply unit configured to selectively supply the second heated water from the second heating conduit or third heated water from a water heater to the first heating conduit as the first water based on the temperature that has been sensed; and a temperature regulator configured to mix an amount of the second heated water with the first heated water to produce mixed water having a regulated temperature.

* * * * *